United States Patent
Klop (10) Patent No.: US 10,730,384 B1
(45) Date of Patent: Aug. 4, 2020

(54) VEHICLE AIR FLOW SHUTTER CONTROL ASSEMBLY AND METHOD

(71) Applicant: Ford Global Technologies, LLC, Dearborn, MI (US)

(72) Inventor: Aaron Klop, Bloomfield Hills, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 16/373,981

(22) Filed: Apr. 3, 2019

(51) Int. Cl.
*B60K 11/00* (2006.01)
*B60K 11/08* (2006.01)

(52) U.S. Cl.
CPC .................. *B60K 11/085* (2013.01)

(58) Field of Classification Search
CPC .............. B60K 11/085; B60K 11/08
See application file for complete search history.

(56) References Cited

U.S. PATENT DOCUMENTS

| 5,141,026 | A  | * | 8/1992  | Collette | B60K 11/085 137/601.09 |
| 6,139,090 | A  | * | 10/2000 | Stidd    | B62D 35/007 180/903 |
| 6,854,544 | B2 | * | 2/2005  | Vide     | B60K 11/085 180/68.1 |
| 8,505,660 | B2 | * | 8/2013  | Fenchak  | B60K 11/085 180/68.1 |
| 8,544,581 | B2 | * | 10/2013 | Stokes   | B60R 19/48 180/68.1 |
| 8,550,887 | B2 |   | 10/2013 | Walters  | |
| 9,272,614 | B1 | * | 3/2016  | Povinelli | B60K 11/06 |
| 9,533,565 | B2 | * | 1/2017  | Elliott   | B60K 11/085 |
| 9,914,352 | B2 | * | 3/2018  | Jakobs    | B62D 35/005 |
| 10,071,625 | B1 |   | 9/2018  | Stoddard et al. | |
| 10,100,707 | B2 | * | 10/2018 | Wolf      | B60K 11/085 |
| 10,518,631 | B2 | * | 12/2019 | Park      | B60K 11/085 |
| 10,525,819 | B2 | * | 1/2020  | Lindberg  | B60K 11/085 |
| 10,532,652 | B2 | * | 1/2020  | Vacca     | F16C 1/02 |
| 10,576,922 | B2 | * | 3/2020  | Yasui     | B60R 19/52 |

(Continued)

FOREIGN PATENT DOCUMENTS

WO 2017182732 10/2017

OTHER PUBLICATIONS

Roechling, Active Grille Shutter, retrieved from https://www.roechling.com/us/automotive/products/aerodynamics/product-line-aerodynamics-engine-encapsulation/active-grille-shutters/.

*Primary Examiner* — James M Dolak
(74) *Attorney, Agent, or Firm* — David Coppiellie, Esq.; Carlson, Gaskey & Olds, P.C.

(57) ABSTRACT

A flow control assembly to control flow to an area of a vehicle includes, among other things, a plurality of shutters including at least one first shutter and at least one second shutter, an actuator assembly rotatable about an axis, a first actuator link operably coupling the actuator assembly to the at least one first shutter, a second actuator link operably coupling the actuator assembly to the at least one second shutter. Rotation of the actuator assembly in a first direction moves the first actuator link to rotate the at least one first shutter in a clockwise direction from a flow restricting position to a flow permitting position. Rotation of the actuator assembly in the first direction additionally moves the second actuator link to rotate the at least one second shutter in a counterclockwise direction from a flow restricting position to a flow permitting position.

16 Claims, 7 Drawing Sheets

(56) References Cited

U.S. PATENT DOCUMENTS

2013/0068403 A1* 3/2013 Fenchak .............. B60K 11/085
  160/218
2014/0090610 A1   4/2014 Higuchi et al.
2014/0273807 A1   9/2014 Frayer, III
2016/0288614 A1* 10/2016 Wild ...................... F16H 25/18

* cited by examiner

VEHICLE AIR FLOW SHUTTER CONTROL ASSEMBLY AND METHOD

TECHNICAL FIELD

This disclosure relates generally to actuating shutters to control flow through an opening of a vehicle.

BACKGROUND

Shutters can be used to regulate flow to various areas of a vehicle, such as radiators, condensers, and other systems. The shutters are actuated to regulate flow through an opening, such as a grille opening to an engine compartment. In some vehicles, shutters are actuated to alter aerodynamic drag on the vehicle.

Typically, the shutters move between a closed position where the shutters interface with each other to substantially block all flow, and an open position where flow moves between adjacent shutters. The shutters contribute to the aesthetics of the vehicle.

SUMMARY

A flow control assembly to control flow to an area of a vehicle according to an exemplary aspect of the present disclosure includes, among other things, a plurality of shutters including at least one first shutter and at least one second shutter, an actuator assembly rotatable about an axis, a first actuator link operably coupling the actuator assembly to the at least one first shutter, and a second actuator link operably coupling the actuator assembly to the at least one second shutter. Rotation of the actuator assembly in a first direction moves the first actuator link to rotate the at least one first shutter in a clockwise direction from a flow restricting position to a flow permitting position. Rotation of the actuator assembly in the first direction additionally moves the second actuator link to rotate the at least one second shutter in a counterclockwise direction from a flow restricting position to a flow permitting position.

In another example of the foregoing flow control assembly, the first shutter is on a passenger side of a vehicle, and the second shutter is on a driver side of the vehicle.

In another example of any of the foregoing flow control assemblies, rotation of the actuator assembly in an opposite, second direction moves the first actuator link to rotate the at least one first shutter in a counterclockwise direction from the flow permitting position to the flow restricting position. Rotation of the actuator assembly in the second direction additionally moves the second actuator link to rotate the at least one second shutter in a clockwise direction from the flow permitting position to the flow restricting position.

In another example of any of the foregoing flow control assemblies, an actuator heim joint couples a first end portion of the first link to the actuator. Another actuator heim joint couples a first end portion of the second link to the actuator.

In another example of any of the foregoing flow control assemblies, a shutter heim joint couples an opposite, second end portion of the first link to the first shutter. Also, another shutter heim joint couples an opposite, second end portion of the second link to the second shutter.

In another example of any of the foregoing flow control assemblies, the axis of rotation of the actuator assembly extends along a longitudinal axis of a vehicle.

In another example of any of the foregoing flow control assemblies, each of the shutters is configured to rotate about a respective vertically extending axis.

In another example of any of the foregoing flow control assemblies, the first shutter is on a passenger side of the actuator assembly, and the second shutter is on a driver side of the actuator assembly.

Another example of any of the foregoing flow control assemblies includes a linkage that moveably couples together one of the first shutters to another of the first shutters.

In another example of any of the foregoing flow control assemblies, each of the shutters has at least one aperture. The plurality of shutters in the flow permitting position permit more flow through the at least one aperture than the plurality of shutters in the flow restricting position.

In another example of any of the foregoing flow control assemblies, the shutters are each spaced a distance from the directly adjacent shutters when the plurality of shutters are in the flow permitting position to provide a gap between each of the shutters within the plurality of shutters.

In another example of any of the foregoing flow control assemblies, the shutters are pivotably attached to a grille housing that provides the grille opening to an engine compartment of a vehicle. The shutters permit more flow through the grille opening when in the flow permitting position than when in the flow restricting position.

A flow control method according to another exemplary non-limiting embodiment of the foregoing disclosure includes, among other things, rotating an actuator in a first direction to rotate a plurality of shutters from a flow restricting position to a flow permitting position, and rotating the actuator in an opposite, second direction to rotate the plurality of shutters from the flow restricting position to the flow permitting position. The plurality of shutters includes at least one first shutter that rotates in a clockwise direction from the flow restricting position to the flow permitting position, and that rotates in a counterclockwise direction from the flow permitting position to the flow restricting position. The plurality of shutters further includes at least one second shutter that rotates in a counterclockwise direction from the flow restricting position to the flow permitting position, and that rotates in a clockwise direction from the flow permitting position to the flow restricting position.

In another example of the foregoing method, the shutters permit more flow through a grille opening to an engine compartment of a vehicle when in the flow permitting position than when in the flow restricting position.

In another example of any of the foregoing methods, the shutters are pivotably attached to a grille housing that provides the grille opening.

In another example of any of the foregoing methods, the shutters each include at least one aperture, and the shutters permit more flow through at least one aperture when in the flow permitting position than when in the flow restricting position.

In another example of any of the foregoing methods, shutters are each spaced a distance from each other when in the flow permitting position to permit flow to move between a gap between adjacent shutters within the plurality of shutters.

In another example of any of the foregoing methods, the shutters rotate between the flow restricting position and the flow permitting position about respective vertically extending axes.

In another example of any of the foregoing methods, the first shutter is on a driver side of a vehicle, and the second shutter is on a passenger side of the vehicle.

In another example of any of the foregoing methods, the first shutter is on a driver side of the actuator, and the second shutter is on a passenger side of the actuator.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to controlling flow through an opening utilizing shutters. The opening can be an opening of a vehicle, such as a grille opening that permits flow from outside the vehicle to an engine compartment of the vehicle.

An actuator assembly can be used to move the shutters to positions where flow can move through apertures in the shutters. The actuator can move the shutters between positions that permit more flow through the apertures and positions that permit less flow through the apertures. The actuator can rotate to cause the shutters to move. The rotation of the actuator in one direction can cause some of the shutters to rotate in a counterclockwise direction and some of the shutters to rotate in a clockwise direction. The shutters can move to alter an appearance of the opening as well as to control flow through the opening.

Figure 1:
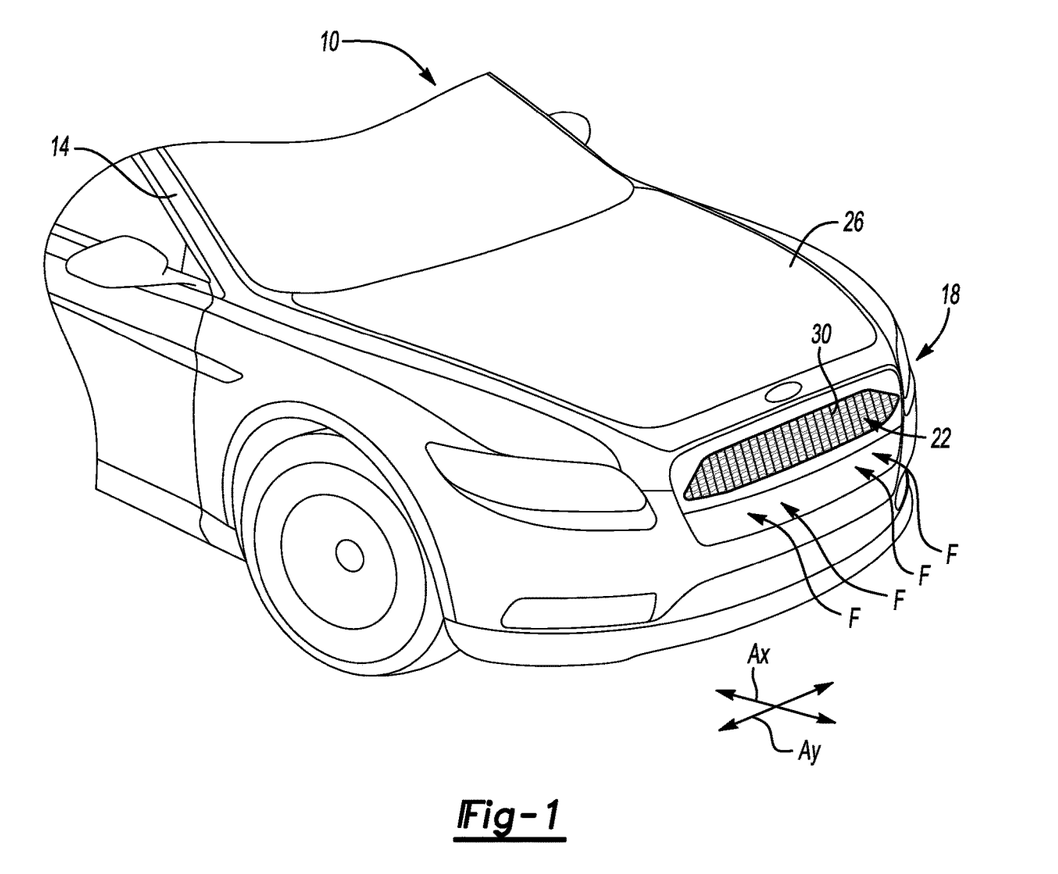
FIG. 1 illustrates a front of a vehicle incorporating a flow control assembly according to an exemplary embodiment of the present disclosure.

Referring to FIG. 1, a front 10 of a vehicle 14 includes a flow control assembly 18 disposed within a grille opening 22 to an engine compartment 26 of the vehicle 14. The flow control assembly 18 is utilized to control movement of a flow F of air from outside the vehicle 14, through the opening 22, to the engine compartment 26.

Although disclosed in connection with the vehicle 14 and the engine compartment 26, the flow control assembly 18 could be utilized to control flow through an opening in another areas of the vehicle 14, such as an opening within a passenger cabin of the vehicle 14, or to control flow in assemblies other than a vehicle.

Referring now to FIGS. 2 to 5 with continuing reference to FIG. 1, the flow control assembly 18, in this exemplary non-limiting embodiment, includes a plurality of shutters 30 each having at least one shutter aperture 34. The shutters 30 are pivotably secured within a grille housing 36. The flow control assembly 18 further includes an actuator assembly 38 that is used to move the shutters 30. Only one actuator assembly 38 is required to rotate the shutters 30 in different directions.

In this example, each of the shutters 30 in the flow control assembly 18 includes at least one shutter aperture 34. In other examples, some of the shutters 30 include at least one shutter aperture 34, and other shutters remain unapertured.

The example flow control assembly 18 includes ten individual shutters 30, but other numbers could be used in other examples. The shutters 30 can have a plan view sweep that matches a desired contour for the grille area of the vehicle 14.

The flow permitted by the flow control assembly 18 to the engine compartment 26 depends, among other things, on the position of the shutters 30. The actuator assembly 38 is used to move the shutters 30 of the flow control assembly 18 back and forth between the fully closed positions of FIGS. 2, 4, and 5, and the fully open position of FIG. 3. The actuator assembly 38 can additionally position the shutters 30 at partially open positions between the fully open and fully closed positions. The various positions can provide design variability. This is because, among other things, the flow control assembly 18 with shutters 30 closed has a different visual geometries than the flow control assembly 18 with the shutters 30 open, or partially open.

Figure 5:
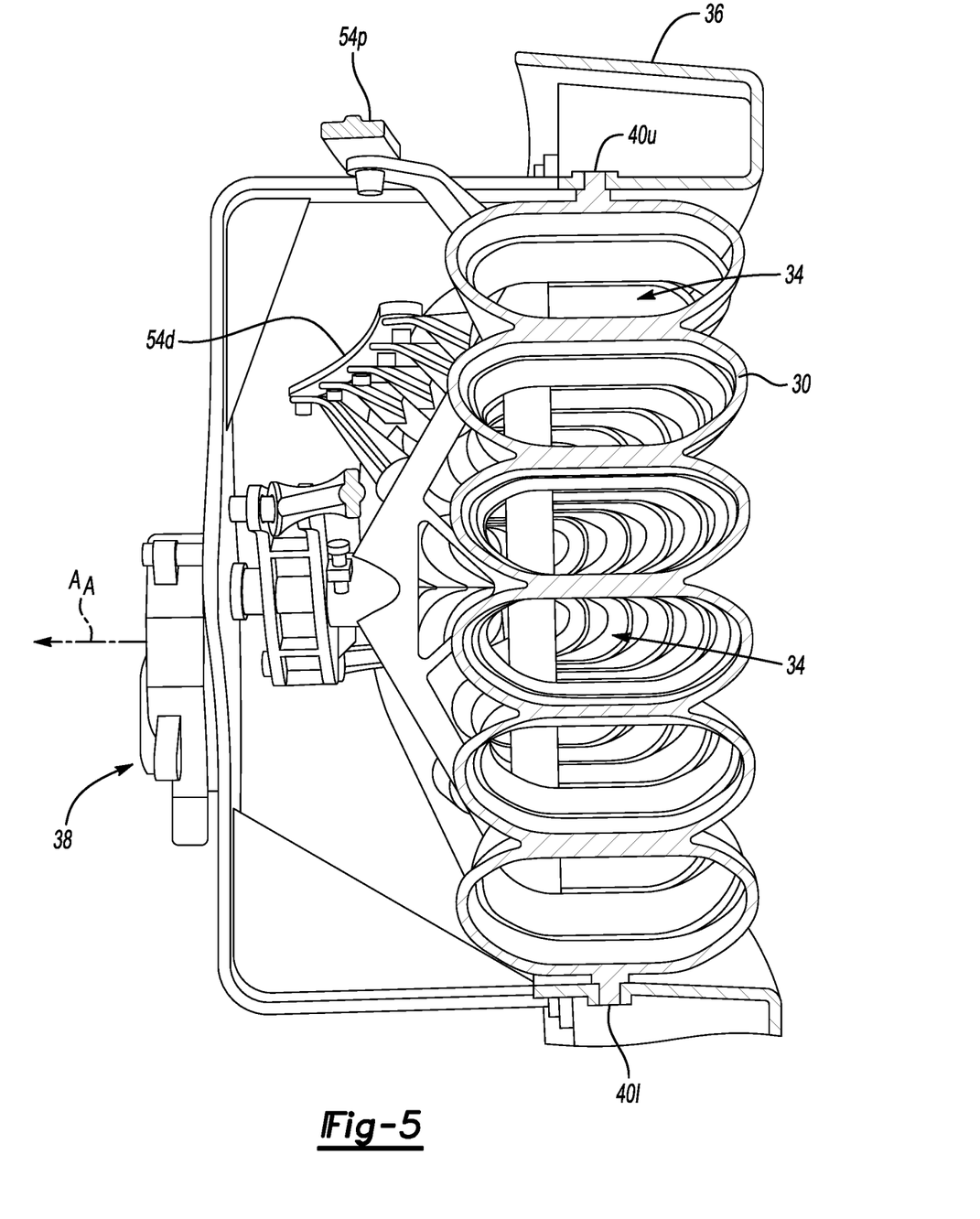
FIG. 5 illustrates a section view taken at line 5-5 in FIG. 2.

To facilitate rotation of the shutters 30, the shutters 30 each include a first pivot pin 40u and a second pivot pin 40l (FIG. 5). In the exemplary embodiment, the first pivot pin 40u is at an upper vertical end of each of the shutters 30, and the second pivot pin 40l is at a lower vertical end of the each of the shutters 30. The first and second pivot pins 40u, 40l are held within respective apertures of the grille housing 36. The receipt of the first and second pivot pins 40u, 40l within the apertures of the grille housing 36 pivotably couples the shutters 30 to the grille housing 36. In another example, the pivot pins, 40n, 40l could extend from the grille housing 36 for receipt within an aperture of the shutters 30.

In this exemplary embodiment, the actuator assembly 38 includes an electrically powered driver 42, a shaft 46, and a bell crank 50. The driver 42 is configured to rotate the shaft 46 about an actuator axis $A_A$ to rotate the bell crank 50 about the axis $A_A$. The actuator assembly 38 is mounted on a support member 52.

Some of the plurality of shutters 30p are on a passenger side, and some of the shutters 30d are on a driver side. That is, some of the shutters 30p are on a passenger side of a centerline $C_L$, and some of the shutters 30d are on a driver side of the centerline $C_L$. A first linkage 54p couples together the shutters 30p on the passenger side. A second linkage 54d couples together the shutters 30d on the driver side.

A first actuator link 58p operably couples the bell crank 50 of the actuator assembly 38 to one of the shutters 30p. A second actuator link 58d operably couples the bell crank 50 of the actuator assembly 38 to one of the shutters 30d.

Figure 6:
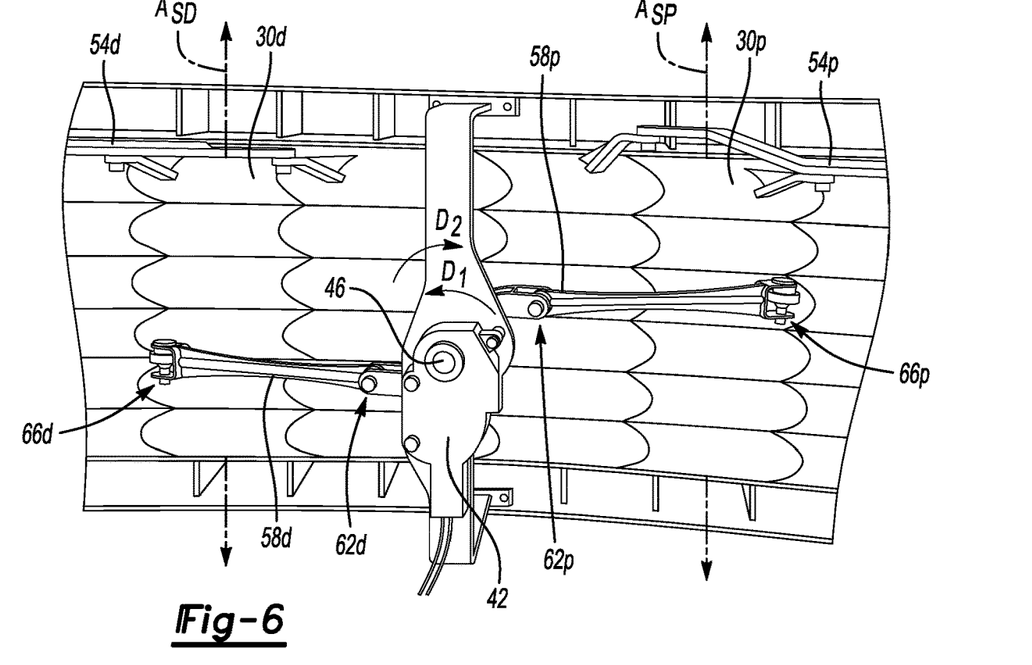
FIG. 6 illustrates a rear view of the flow control assembly in the position of FIG. 6 with the plurality of shutters in the fully closed position.

Movement of the shutters 30 from a flow restricting position to a flow permitting positon will now be described with reference to FIGS. 6 to 8 and continued reference to FIGS. 1 to 5. The flow permitting position is a position that permits more of the flow F to move through the apertures 34 that the flow restricting position. The shutters 30 in the position of FIG. 6 are in a flow restricting position relative to the shutters 30 in the positions of FIGS. 7 and 8. The shutters 30 in the position of FIG. 7 are in a flow permitting position relative to the shutters 30 of FIG. 6, but in a flow restricting position relative to the shutters 30 of FIG. 8.

Figure 7:
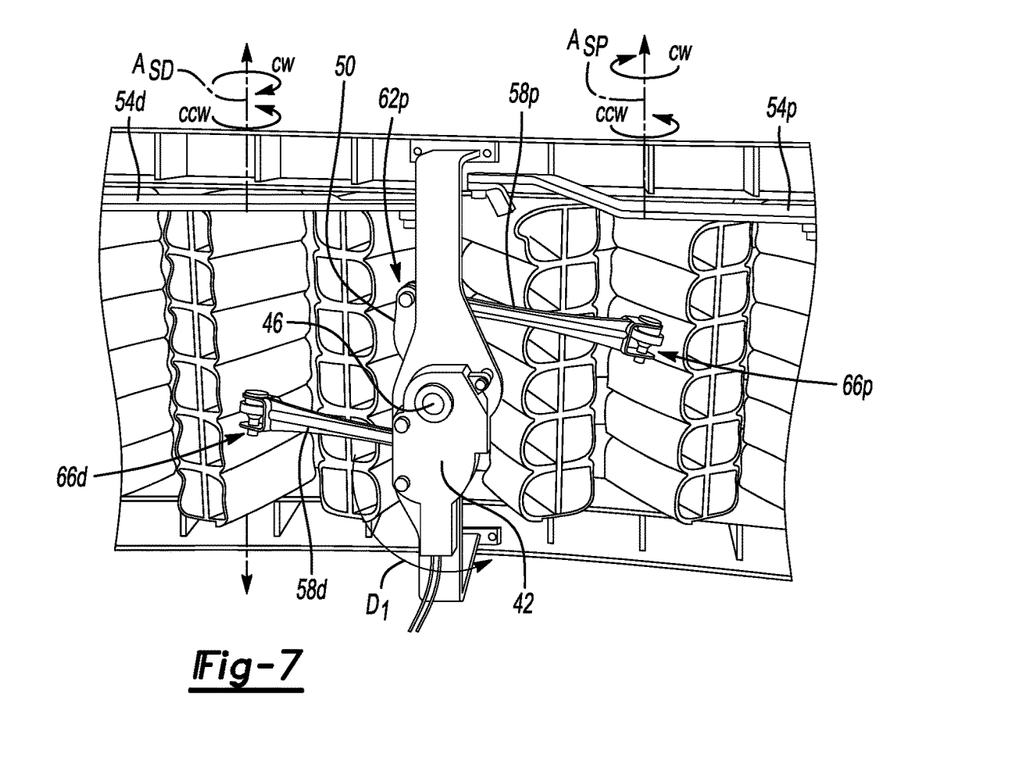
FIG. 7 illustrates a rear view of the flow control assembly in the position of FIG. 6 with the plurality of shutters moved from the fully closed position of FIG. 2 toward the fully open position of FIG. 3.

To move the shutters 30 from the position of FIG. 6 to the positon of FIG. 7, the driver 42 of the actuator assembly 38 rotates the shaft 46 to rotate the bell crank 50 about the axis $A_A$ in a first direction $D_1$. The rotation of the bell crank 50 from the position of FIG. 6 to the position of FIG. 7 pulls the first actuator link 58p and the second actuator link 58d inward toward the centerline $C_L$ of the vehicle 14.

Because the first actuator link 58p is coupled to one of the shutters 30p, pulling the first actuator link 58p inward rotates the one of the shutters 30p in a clockwise direction about a passenger side shutter axis $A_{SP}$. The shutter 30p that is operably coupled to the first actuator link 58p is coupled together with the other shutters 30p on the passenger side through the first linkage 54p. Thus, rotation of the shutter 30p that is operably coupled to the first actuator link 58p causes the remaining shutters 30p to also rotate in a clockwise direction about respective passenger side shutter axes.

Because the second actuator link 58d is coupled to one of the shutters 30d, pulling the second actuator link 58d inward rotates the one of the shutters 30d in a counterclockwise direction about a driver side shutter axis $A_{SD}$. The shutter 30d that is operably coupled to the second actuator link 58d is coupled together with the other shutters 30d on the driver side through the second linkage 54d. Thus, rotation of the shutter 30d that is operably coupled to the second actuator link 58d causes the remaining shutters 30p to also rotate in a clockwise direction about respective passenger side shutter axes.

Figure 8:
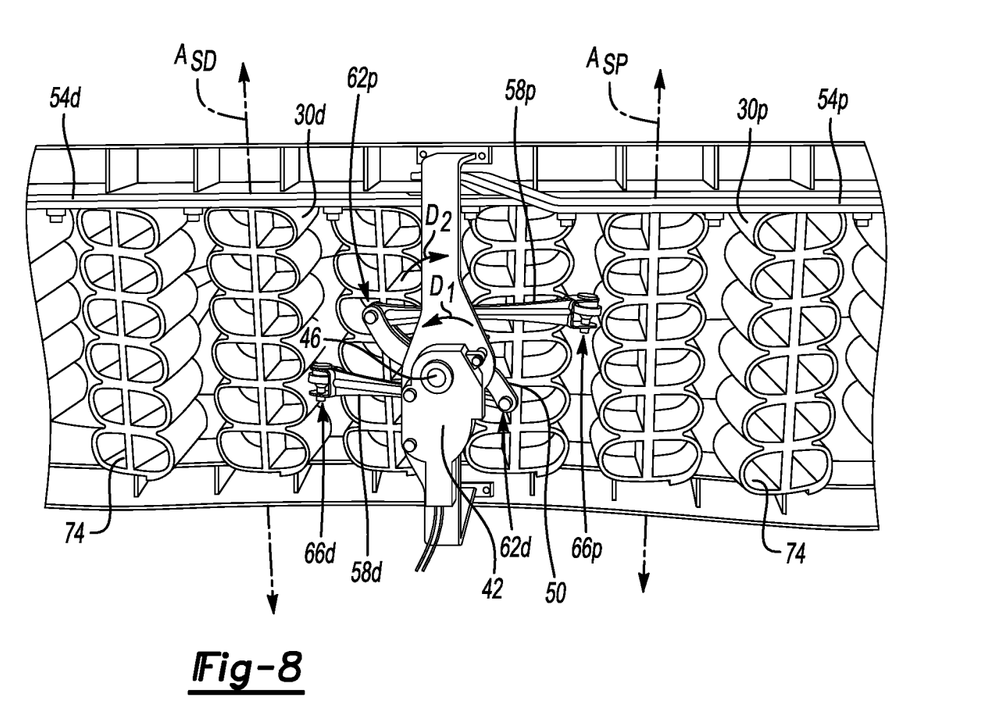
FIG. 8 illustrates a rear view of the flow control assembly in the position of FIG. 6 with the plurality of shutters in the fully open position of FIG. 3.

Continued rotation of the bell crank 50 from the position of FIG. 7 to the position of FIG. 8 pulls the first actuator link 58p and the second actuator link 58d further inward toward a centerline of the vehicle 14. This continues to cause the plurality of shutters 30p to rotate in a clockwise direction, and the plurality of shutters 30d to rotate in a counterclockwise direction until the shutters 30p and 30d are positioned as shown in FIG. 8.

To move the shutters 30p and 30d back to the position of FIG. 6, the driver 42 rotates the shaft 46 to rotate the bell crank 50 about the axis $A_A$ in a second direction $D_2$ that is opposite the first direction $D_1$. In this example, the shutters 30 are rotated 90 degrees when moving from the fully closed position to the fully open position. As desired, the actuator assembly 38 can stop the rotation of the shaft 46 to position the shutters 30p and 30d at positions between the fully closed position of FIG. 6 and the fully open position of FIG. 8.

In this example, the shutters 30 each rotate about a vertically oriented axis. In other examples, the shutters 30 could be configured to rotate about axes having different orientations, such as horizontal. Vertical and horizontal, for purposes of this disclosure, are with reference to ground and a normal orientation of the vehicle 14 when driving or parked.

In some examples, areas of the shutters 30 could be painted in different colors so that the visible areas of the shutters 30 in the fully closed position are textured or colored differently than the visible areas of the shutters 30 in the fully open position. This could provide even greater design flexibility and desirable aesthetics to the flow control assembly 18.

Mechanical actuating joints can be used to couple the first actuator link 58p to the bell crank 50 and to the shutters 30p, and to couple the second actuator link 58d to the bell crank 50 and to the shutters 30d. The mechanical actuating joints can be heim-type joints that include a ball swivel 67 pressed into a casing 69.

Figure 9:
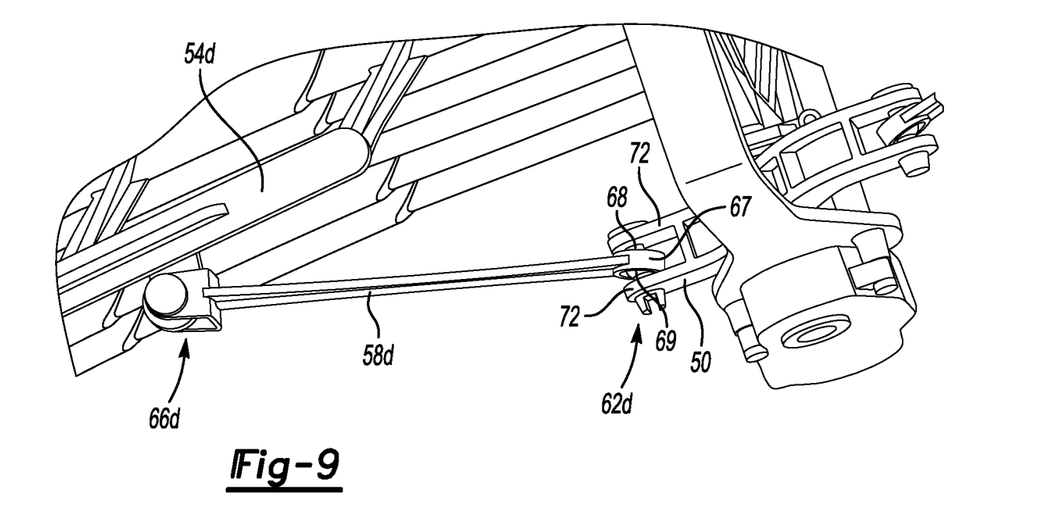
FIG. 9 illustrates a close-up perspective view of the actuator heim joint and the shutter heim joint used to operably link an actuator to some of the shutters.

In the exemplary embodiment, an actuator heim joint 62p couples the first actuator link 58p to the bell crank 50, and a shutter heim joint 66p couples the first actuator link 58p to at least one of the shutters 30p. Further, an actuator heim joint 62d couples the first actuator link 58d to the bell crank 50, and a shutter heim joint 66d couples the first actuator link 58d to at least one of the shutters 30d. FIG. 9 shows a close-up perspective view of the actuator heim joint 62d and the shutter heim joint 66d.

In the example heim joints 62d, the ball swivel 67 is held by the first actuator link 58d. The ball swivel 67 includes an opening that receives a rod or pin 68. The pin 68 is snap-fit to flanges 72 of the bell crank 50. Passing the pin 68 through the ball swivel 67 allows the pin 68 to be somewhat misaligned relative to the casing 69 as the first actuator link 58d is moved by the bell crank 50. The pin 68 may become misaligned relative to the casing 69 when transitioning the shutters 30 back and forth between flow permitting and flow restricting positions.

The first actuator links 58d and 58p, along with the heim joints, can be made of a polymer-based material. The first actuator links 58d and 58p can be injection molded, along with the heim joints.

Figure 4:
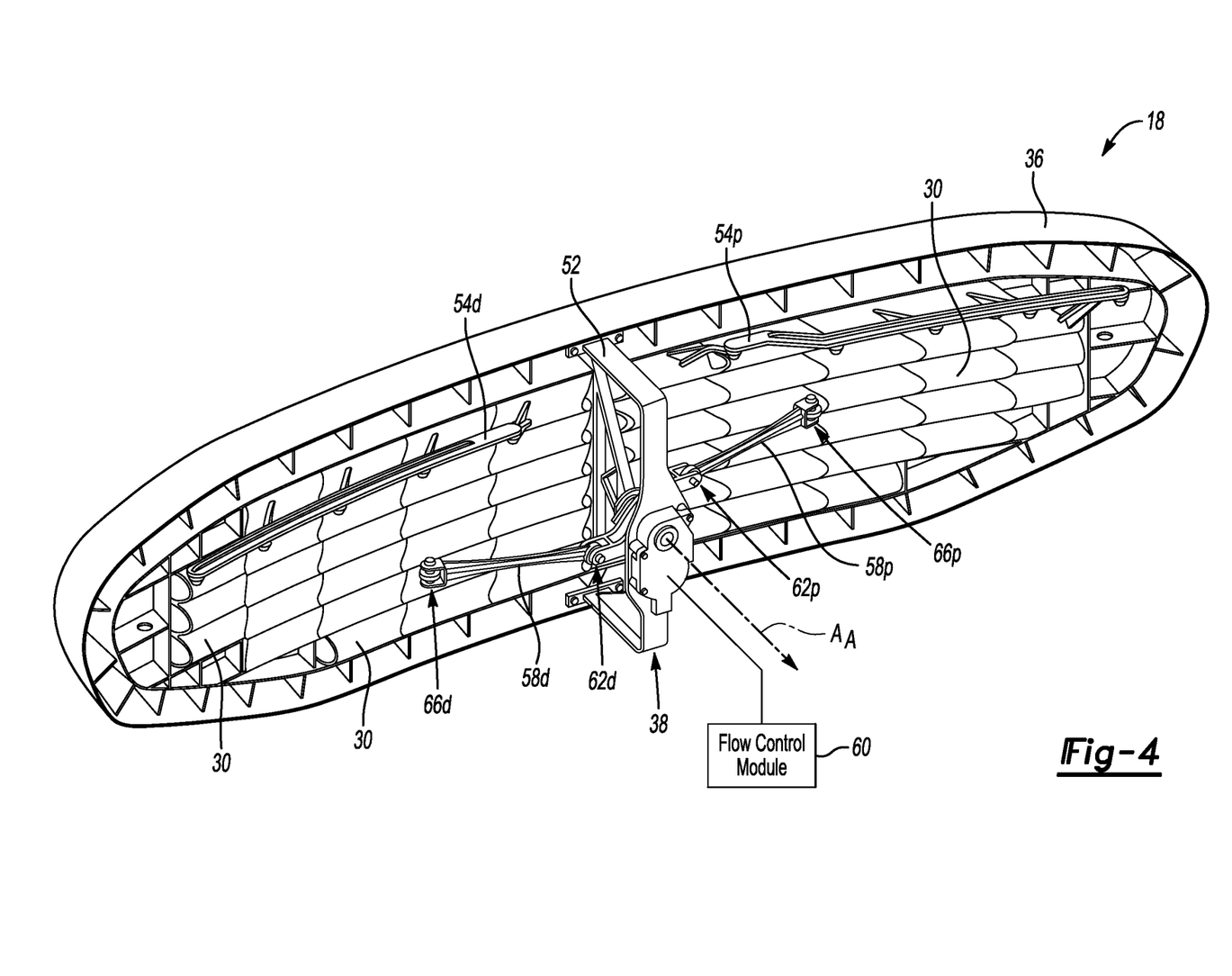
FIG. 4 illustrates a perspective rear view of the flow control assembly of FIG. 1 with the plurality of shutters in the fully closed position.

The actuator assembly 38 can rotates the shutters 30 in response to a command from a flow control module 60 (FIG. 4). The actuator assembly 38 could be commanded to rotate the shutters 30 in response to a command from a user, or automatically in response to a vehicle condition. For example, if a speed of the vehicle 14 exceeds a threshold speed, the flow control module 60 may command the actuator assembly 38 to move the shutters 30 the fully closed position of FIG. 6. This positioning of the shutters 30 blocks the flow F through the opening 22, which can enhance fuel economy by reducing aerodynamic drag on the vehicle 14.

Figure 2:
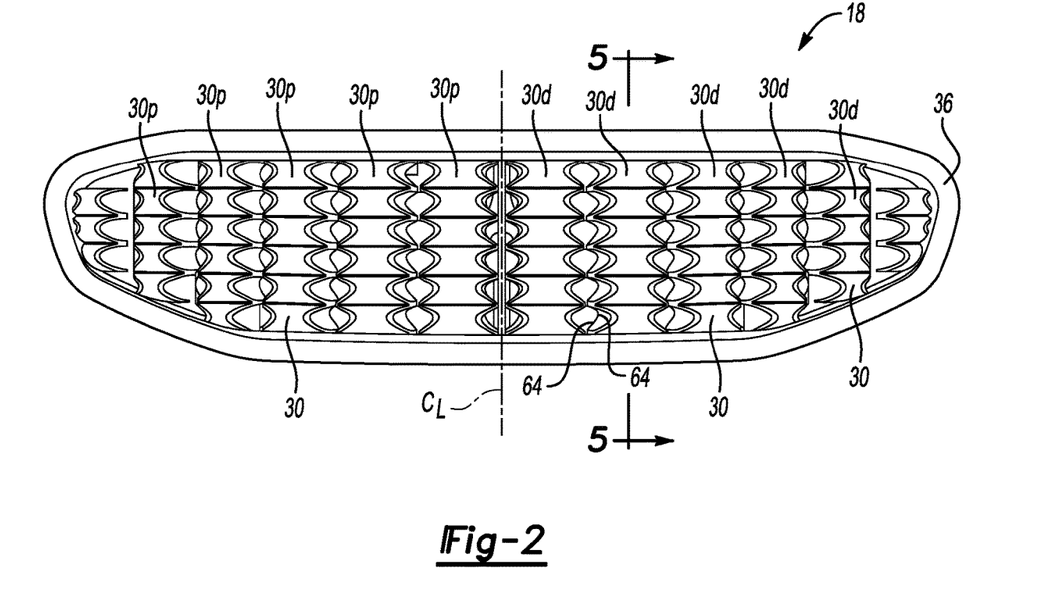
FIG. 2 illustrates a front view of the flow control assembly of FIG. 1 with a plurality of shutters in a fully closed position.

When all the shutters 30 are in the closed position of FIG. 2, the shutters 30 substantially block all flow through the opening 22. In the closed position, the shutters 30 are rotated such that each opposing lateral edges 64 of the shutters 30 is directly adjacent a lateral edge 64 of an adjacent shutter 30, or a portion of the vehicle 14 providing the opening 22. This positioning of the shutters 30 can block flow F from moving through gaps between the shutters 30 to the engine compartment 26, and additionally blocks flow from moving through the shutter apertures 34 to the engine compartment 26.

Figure 3:
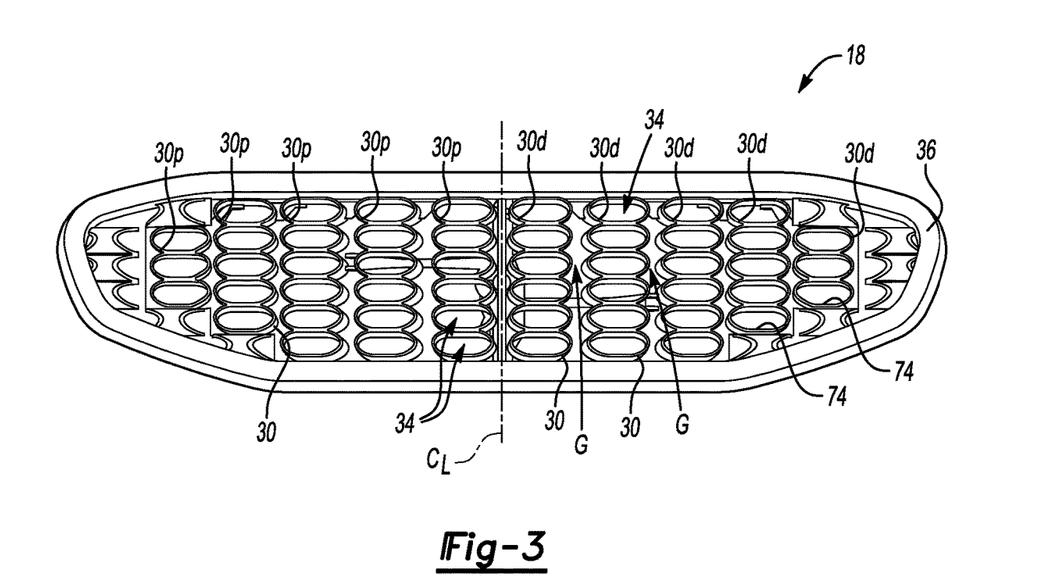
FIG. 3 illustrates a front view of the flow control assembly of FIG. 1 with the plurality of shutters in a fully open position.

When the actuator assembly 38 moves the shutters 30 to the fully open position of FIG. 3, or a partially open position (FIG. 7, for example), some of the flow F can move through the shutter apertures 34 to the engine compartment 26. When the actuator assembly 38 moves the shutters 30 to the fully open position of FIG. 3, or the partially open position, some of the flow can additionally move through the gaps G between the shutters 30.

The flow control module 60 commanding the actuator assembly 38 can be equipped with executable instructions for interfacing with and commanding operation of the actuator assembly 38 of the flow control assembly 18. The flow control module 60 can include a processing unit and non-transitory memory for executing the various control strategies and modes of the flow control assembly 18. The processing unit, in an embodiment, is configured to execute one or more programs stored in the memory of the flow control module 60. It should be understood that the flow control module 60 could be part of an overall vehicle control module, such as a vehicle system controller (VSC), or could alternatively be a stand-alone controller separate from the VSC.

Notably, an outer perimeter of the shutter apertures 34 is each provided entirely by one of the shutters 30. That is, the shutter 30 extends about an entire circumference of the shutter aperture 34. The repositioning of the shutters 30 by the actuator assembly 38 can move inlets 74 (FIG. 3) of the shutters 30 to an exposed position where the inlets 74 can receive flow from outside the vehicle 14. As the vehicle 14 is driven forward, the flow F can move through the inlets 74, into the respective shutter apertures 34, and through the outlets 78 (FIG. 8) to the engine compartment 26. The shutter aperture 34 effectively directs the flow into the engine compartment 26.

The vehicle 14 generally has a longitudinal axis $A_X$ and a cross-car axis $A_Y$ (see FIG. 1). When the shutters 30 are in the closed position of FIGS. 2, 4, 5, and 6, the longitudinal axes of the shutter apertures 34 are substantially aligned with the cross-car axis $A_Y$. The longitudinal axes of the shutter apertures 34 extends from the respective inlet 74 to the respective outlet 78 (FIG. 8). In the fully open position of FIGS. 3 and 8, the longitudinal axis $A_X$ of the vehicle 14 and the longitudinal axes $A_A$ of the shutter apertures 34 are substantially parallel to each other. Also, the axis of rotation $A_A$ of the actuator assembly 38 extends along the longitudinal axis $A_x$ of the vehicle 14.

Repositioning the shutter apertures 34 to a position where the inlets 74 can receive flow involves rotating the shutters 30 such that the longitudinal axes of the shutter apertures 34 are more aligned with the longitudinal axis $A_Y$ of the vehicle 14.

Figure 10:
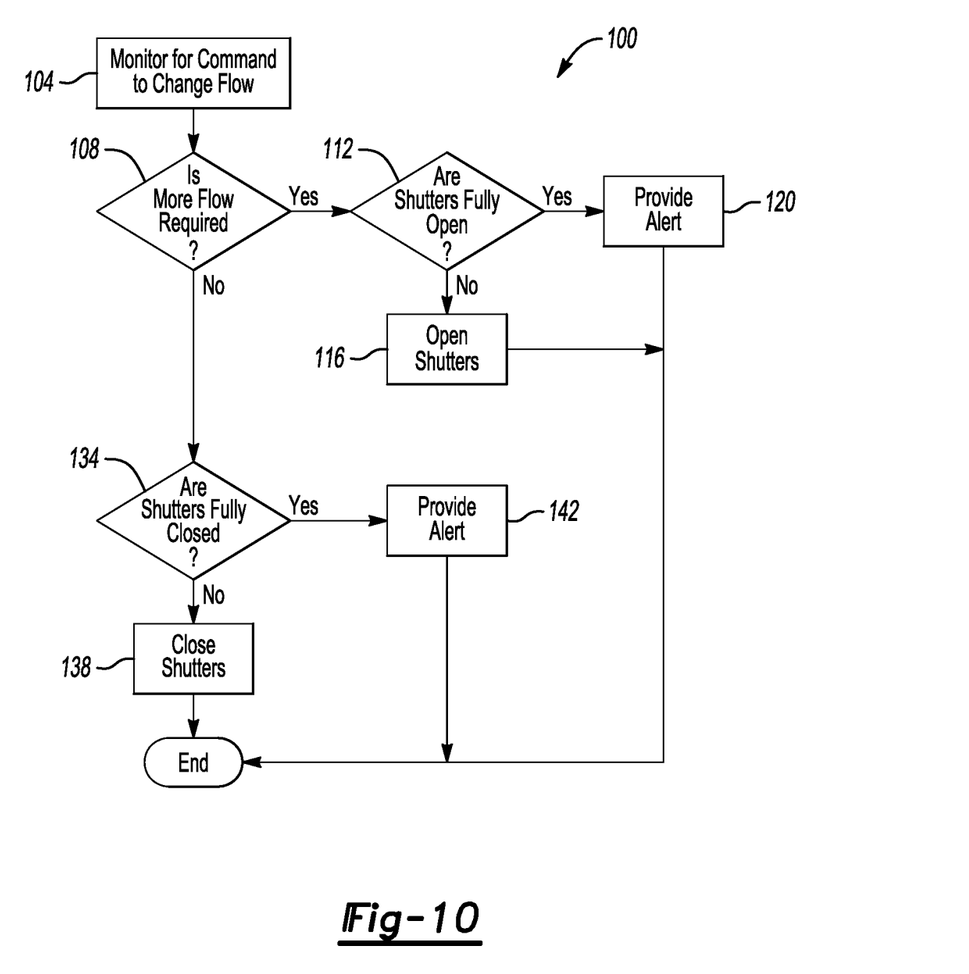
FIG. 10 illustrates the steps in an example flow control method that utilizes the flow control assembly of FIGS. 1-9.

Referring now to FIG. 10, an exemplary flow control method 100 begins at a step 104 where the method 100 monitors for a command to change flow through an opening to an engine compartment. The step 108 then calculates if the command is a request for more flow. If yes, the method 100 moves to a step 112, which calculates whether the shutters are fully open. If, at the step 112, the shutters are not fully open, the method 100 moves to a step 116 where an actuator is commanded to open the shutters to increase the flow. If, at the step 112, the shutters are fully open, the method 100 provides an alert at a step 120. The alert could be a visual alert, and audio alert, or some combination of these. The alert notifies a user that the shutters are fully open.

If the step 108 calculates that the command is not a request for more flow, the request is interpreted as a request for less flow. The method 100 then moves from the step 108 to the step 134, which calculates whether the shutters are fully closed. If, at the step 134, the shutters are not fully closed, the method 100 moves to a step 138 where an actuator is commanded to close the shutters to decrease the flow. If, at the step 134, the shutters are fully closed, the method 100 provides an alert at a step 120. The alert could be a visual alert, and audio alert, or some combination of these. The alert notifies a user that the shutters are fully closed.

The method 100 after the steps 116, 120, 138 and 142. The method 100 may return to the step 104 of monitoring after ending.

The method 100 could instead, or additionally, be used to change the aesthetics of the opening to the engine compartment. For example, the step 104 could instead monitor for a command to change the aesthetics of the grille by switching from, for example, a visible array of inlets to apertures in shutters to a visible array of another design feature.

Features of the disclosed examples include a flow control assembly with moveable shutters having shutter apertures. Some of the moveable shutters rotated clockwise from a flow permitting to a flow restricting position, and some of the moveable shutters rotate counterclockwise from a flow permitting position to a flow restricting position. A single actuator can be used to rotate all the shutters, which can reduce complexity and cost.

The flow control assembly can alter flow through an opening, such as an opening to an engine compartment of a vehicle. In particular, changes to the position of the shutters can be made to change an amount of flow through shutter apertures of the shutters, which alters flow through the opening. Closing the opening, such as an engine compartment opening, may be desirable to meet marketing and design appearance wants. However, the opening is desired to still sometimes permit flow to meet, for example, cooling and climate control attributes.

The position of the shutters can be changed to instead, or additionally, alter the aesthetics of the opening. Some or all of the shutters could, for example, move to a position to provide a particular appearance to the opening.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A flow control assembly to control flow to an area of a vehicle, comprising:
   a plurality of shutters including at least one first shutter and at least one second shutter;
   an actuator assembly rotatable about an axis;
   a first actuator link operably coupling the actuator assembly to the at least one first shutter; and
   a second actuator link operably coupling the actuator assembly to the at least one second shutter,
      wherein rotation of the actuator assembly in a first direction moves the first actuator link to rotate the at least one first shutter in a clockwise direction from a flow restricting position to a flow permitting position,
      wherein rotation of the actuator assembly in the first direction additionally moves the second actuator link to rotate the at least one second shutter in a counterclockwise direction from a flow restricting position to a flow permitting position
      wherein each of the shutters within the plurality of shutters has at least one aperture, wherein the plurality of shutters in the flow permitting position permit more flow through the at least one aperture than the plurality of shutters in the flow restricting position; and
   further comprising an actuator heim joint that couples a first end of the first link to the actuator, the heim joint including a ball swivel having an opening that receives a pin, the ball swivel disposed within a casing, the ball swivel permitting movement of the pin relative to the casing.

2. The flow control assembly of claim 1, wherein the at least one first shutter is on a passenger side of the vehicle, and the at least one second shutter is on a driver side of the vehicle.

3. The flow control assembly of claim 1,
wherein rotation of the actuator assembly in an opposite, second direction moves the first actuator link to rotate the at least one first shutter in a counterclockwise direction from the flow permitting position to the flow restricting position,
wherein rotation of the actuator assembly in the second direction additionally moves the second actuator link to rotate the at least one second shutter in a clockwise direction from the flow permitting position to the flow restricting position.

4. A flow control assembly to control flow to an area of a vehicle, comprising:
a plurality of shutters including at least one first shutter and at least one second shutter;
an actuator assembly rotatable about an axis;
a first actuator link operably coupling the actuator assembly to the at least one first shutter; and
a second actuator link operably coupling the actuator assembly to the at least one second shutter,
wherein rotation of the actuator assembly in a first direction moves the first actuator link to rotate the at least one first shutter in a clockwise direction from a flow restricting position to a flow permitting position,
wherein rotation of the actuator assembly in the first direction additionally moves the second actuator link to rotate the at least one second shutter in a counterclockwise direction from a flow restricting position to a flow permitting position,
wherein an actuator heim joint couples a first end portion of the first link to the actuator, wherein another actuator heim joint couples a first end portion of the second link to the actuator; and
wherein the actuator heim joints each include a ball swivel;
wherein the ball swivels each include openings that receive a respective pin that is snap-fit to flanges of a bell crank of the actuator assembly.

5. The flow control assembly of claim 4, wherein a shutter heim joint couples an opposite, second end portion of the first link to the at least one first shutter, wherein another shutter heim joint couples an opposite, second end portion of the second link to the at least one second shutter.

6. The flow control assembly of claim 1, wherein the axis of rotation of the actuator assembly extends along a longitudinal axis of the vehicle.

7. The flow control assembly of claim 1, wherein each of the shutters within the plurality of shutters rotates about a respective vertically extending axis.

8. The flow control assembly of claim 1, wherein the at least one first shutter is on a passenger side of the actuator assembly, and the at least one second shutter is on a driver side of the actuator assembly.

9. The flow control assembly of claim 1, wherein the plurality of shutters are each spaced a distance from the directly adjacent shutters when the plurality of shutters are in the flow permitting position to provide a gap between each of the shutters within the plurality of shutters.

10. The flow control assembly of claim 1, wherein the plurality of shutters are pivotably attached to a grille housing that provides the grille opening to an engine compartment of the vehicle, wherein the plurality of shutters permit more flow through a grille opening when in the flow permitting position than when in the flow restricting position.

11. The flow control assembly of claim 1, wherein the at least one aperture is a shutter aperture having an outer perimeter provided entirely by one of the plurality of shutters.

12. The flow control assembly of claim 1, wherein the at least one aperture includes a plurality of shutter apertures within one of the plurality of shutters, each of the plurality of shutter apertures having an outer perimeter provided entirely by the one of the plurality of shutters.

13. The flow control assembly of claim 12, wherein the plurality of shutter apertures are disposed along a vertically extending axis.

14. The flow control assembly of claim 1, wherein the at least one aperture is a shutter aperture within one of the plurality of shutters, and the one of the plurality of shutters extends about an entire circumference of the shutter aperture.

15. The flow control assembly of claim 4, wherein the at least one aperture includes a plurality of shutter apertures within one of the plurality of shutters, each of the plurality of shutter apertures having an outer perimeter provided entirely by the one of the plurality of shutters, the plurality of shutter apertures disposed along a vertically extending axis.

16. A flow control assembly to control flow to an area of a vehicle, comprising:
at least one first shutter that provide an entire circumferential perimeter of a first shutter aperture;
at least one second shutter that provides an entire circumferential perimeter of a second shutter aperture;
an actuator assembly rotatable about an axis;
a first actuator link operably coupling the actuator assembly to the at least one first shutter; and
a second actuator link operably coupling the actuator assembly to the at least one second shutter,
wherein rotation of the actuator assembly in a first direction moves the first actuator link to rotate the at least one first shutter in a clockwise direction from a flow restricting position through the first shutter aperture to a flow permitting position through the first shutter aperture,
wherein rotation of the actuator assembly in the first direction additionally moves the second actuator link to rotate the at least one second shutter in a counterclockwise direction from a flow restricting position through the second shutter aperture to a flow permitting position through the second shutter aperture; and
wherein an actuator heim joint couples a first end portion of the first link to the actuator, wherein another actuator heim joint couples a first end portion of the second link to the actuator, the heim joints each including a ball swivel within a casing, the ball swivel receiving a pin.

* * * * *